(12) United States Patent
Dietl et al.

(10) Patent No.: US 9,458,369 B2
(45) Date of Patent: *Oct. 4, 2016

(54) ANTIFREEZE CONCENTRATE WITH CORROSION PROTECTION AND AQUEOUS COOLANT COMPOSITION PRODUCED THEREFROM

(71) Applicant: BASF SE, Ludwigshafen (DE)

(72) Inventors: Harald Dietl, Ludwigshafen (DE); Uwe Nitzschke, Ludwigshafen (DE); Gerhard Weiss, Ludwigshafen (DE)

(73) Assignee: BASF SE, Ludwigshafen (DE)

( * ) Notice: Subject to any disclaimer, the term of this patent is extended or adjusted under 35 U.S.C. 154(b) by 0 days.

This patent is subject to a terminal disclaimer.

(21) Appl. No.: 14/672,555

(22) Filed: Mar. 30, 2015

(65) Prior Publication Data

US 2015/0203735 A1    Jul. 23, 2015

Related U.S. Application Data

(63) Continuation of application No. 14/176,251, filed on Feb. 10, 2014, now Pat. No. 9,080,093.

(60) Provisional application No. 61/763,959, filed on Feb. 13, 2013.

(51) Int. Cl.
| | |
|---|---|
| *C09K 5/20* | (2006.01) |
| *C23F 11/167* | (2006.01) |
| *C23F 11/12* | (2006.01) |
| *F01P 3/00* | (2006.01) |
| *C23F 11/08* | (2006.01) |

(52) U.S. Cl.
CPC ............. *C09K 5/20* (2013.01); *C23F 11/08* (2013.01); *C23F 11/124* (2013.01); *C23F 11/1673* (2013.01); *F01P 3/00* (2013.01); *F01P 2003/001* (2013.01)

(58) Field of Classification Search
None
See application file for complete search history.

(56) References Cited

U.S. PATENT DOCUMENTS

| | | | | |
|---|---|---|---|---|
| 5,080,818 | A | * | 1/1992 | Tachiiwa et al. ............... 252/75 |
| 6,228,283 | B1 | | 5/2001 | Turcotte et al. |
| 2008/0149883 | A1 | | 6/2008 | Kormann et al. |
| 2009/0294102 | A1 | * | 12/2009 | Yang et al. ............. 165/104.19 |
| 2011/0163260 | A1 | | 7/2011 | Kormann et al. |
| 2013/0105407 | A1 | | 5/2013 | Kormann et al. |

FOREIGN PATENT DOCUMENTS

| | | |
|---|---|---|
| DE | 196 05 509 | 8/1997 |
| DE | 100 36 031 | 2/2002 |
| EP | 0 025 125 | 3/1981 |
| WO | WO 99/61545 | 12/1999 |
| WO | WO 2006/092376 | 9/2006 |
| WO | WO 2009/111443 | 9/2009 |

OTHER PUBLICATIONS

International Search Report issued Apr. 29, 2014 in PCT/EP2014/051988 ( with English Translation of Category of Cited Documents).

* cited by examiner

*Primary Examiner* — Necholus Ogden, Jr.
(74) *Attorney, Agent, or Firm* — Oblon, McClelland, Maier & Neustadt, L.L.P.

(57) ABSTRACT

Antifreeze concentrate with corrosion protection which is suitable for coolants and heat transfer fluids and comprises freezing point-lowering liquids and also particular sulfur-comprising organic compounds, inorganic molybdate salts, inorganic phosphate salts and aliphatic, cycloaliphatic or aromatic monocarboxylic, dicarboxylic or tricarboxylic acids as corrosion inhibitors. Aqueous coolant compositions which are suitable for cooling an internal combustion engine whose cooling apparatus has been made of aluminum using a soldering process using a fluoroaluminate flux can be obtained therefrom.

10 Claims, No Drawings

ANTIFREEZE CONCENTRATE WITH CORROSION PROTECTION AND AQUEOUS COOLANT COMPOSITION PRODUCED THEREFROM

This is a continuation of U.S. application Ser. No. 14/176,251, filed Feb. 10, 2014, which claims priority to U.S. Provisional Application No. 61/763,959, filed Feb. 13, 2013, of which all of the disclosures are incorporated herein by reference in their entireties.

The present invention relates to a novel antifreeze concentrate based on freezing point-lowering liquids as main constituent, specific sulfur-comprising organic compounds as corrosion inhibitors and also further corrosion inhibitors which are different therefrom. This antifreeze concentrate is suitable for coolants, for example for internal combustion engines, and for heat transfer fluids. The present invention further relates to an aqueous coolant composition produced therefrom. The present invention further relates to the use of this aqueous coolant composition for cooling an internal combustion engine whose cooling apparatus has been made from aluminum by soldering using a fluoroaluminate flux. The present invention further relates to the use of particular sulfur-comprising organic compounds as corrosion inhibitors in such antifreeze concentrates and aqueous coolant compositions in general.

Coolant compositions for the cooling apparatuses (which are usually configured as cooling circuits) of internal combustion engines of, for example, automobiles usually comprise alkylene glycols such as monoethylene glycol or monopropylene glycol, optionally in admixture with glycerol, as antifreeze component which lowers the freezing point of the coolant composition. Apart from further components such as antifoams, dyes or bitter substances, corrosion inhibitors, in particular, are comprised.

Especially in modern internal combustion engines, temperatures which place severe demands on the materials used are reached. Any type and any extent of corrosion represent a potential risk factor which can lead to shortening of the life of the engine and to a decrease in reliability. Furthermore, a number of different materials, for example cast iron, copper, brass, soft solder, steel and also aluminum, aluminum alloys and magnesium alloys, are increasingly being used in modern engines. This plurality of metallic materials additionally results in potential corrosion problems, in particular at the places where different metals are in contact with one another. Various types of corrosion such as pit corrosion, crevice corrosion, erosion or cavitation can occur comparatively easily at such places in particular. The coolant compositions likewise have to be compatible with nonmetallic constituents of the cooling apparatuses, for example elastomers and plastics from hose connections or seals, and must not change these. Furthermore, the type of coolant composition is of critical importance for heat transfer in modern internal combustion engines.

For some time, the cooling apparatus or cooling circuits for internal combustion engines which are usually used in vehicle and automobile construction but also for stationary engines have been made predominantly or solely of aluminum or aluminum alloys. Specific soldering processes, for example soldering under a protective gas atmosphere, are used here. In such soldering processes, the concomitant use of a flux is necessary. Here, potassium fluoro-aluminates is usually used as flux, for example a mixture of $KAlF_4$, $K_2AlF_5$ and $K_3AlF_6$ (for example commercially available under the name Nocolok®).

Part of the fluxes mentioned remains on the surface of the cooling apparatus after the soldering operation. These flux residues in the cooling apparatus lead more or less quickly to precipitation of aluminum hydroxide gels and thus to sludge formation in the cooling circuit after introduction of aqueous coolant compositions and operation of the engine due to a chain of chemical reactions, which are in equilibrium with one another, with the water and the constituents of the aqueous coolant compositions. This greatly restricts the effectiveness of heat removal from the engine and as a consequence also the functions of the heat exchange for the heating system, cooling of the air supply and gearbox oil cooling. In addition, the presence of aluminum hydroxide gels has an adverse effect on the corrosion protection provided by the coolant because the corrosion protection action is considerably reduced as a result of adsorption of the corrosion inhibitors on the aluminum hydroxide gels.

WO 2009/111443 A2 discloses heat transfer fluids based on alcohols which can be used in heat exchanger apparatuses which contain aluminum components soldered using potassium fluoroaluminate fluxes. For these heat transfer fluids, an entire series of possible individual corrosion inhibitors which are inorganic or organic in nature, e.g. molybdates, tungstates, vanadates, phosphates, antimonates, nitrates, nitrites, borates, azoles or carboxylates, are recommended. 2-Mercaptobenzothiazole (MTB) is mentioned as a sulfur-comprising azole which can be used. Table 1 shows, as base coolant concentrate, a formulation (I) based on monoethylene glycol and comprising >94% by weight of ethylene glycol, 0.1-0.3% by weight of tolyltriazole, 0.2-0.5% by weight of nitrate, 0.04-0.1% by weight of molybdate, 0.1-2.0% by weight of borax, 0.1-0.5% by weight of phosphoric acid, <0.3% by weight of MBT, 0.1-0.5% by weight of silicate and 0.4-2.0% by weight of NaOH/KOH, where MBT could but does not necessarily have to be mercaptobenzothiazole since no explanation of MBT is given.

However, no adequate coolant composition with corrosion protection for internal combustion engines, which actually meet the requirements in respect of increased flux tolerance when used in aluminum cooling apparatuses soldered using the abovementioned fluxes, have been found to date. It was therefore an object of the invention to provide an antifreeze concentrate with corrosion protection from which it is possible to obtain an aqueous coolant composition which has a high tolerance to residues of fluoroaluminate fluxes in soldered aluminum radiators, i.e. which no longer tends, or tends to a significantly less extent, to form precipitates of aluminum hydroxide gels and formation of sludge in the cooling circuit and thus makes more effective corrosion protection possible.

We have accordingly found an antifreeze concentrate with corrosion protection, which comprises (A) at least one freezing point-lowering liquid selected from among monohydric, dihydric and trihydric alcohols, polyhydroxy alcohols, their ethers and mixtures thereof as main constituent;

(B) at least one sulfur-comprising organic compound selected from among
 (B1) compounds comprising the structural element of the formula

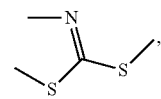

(B2) heterocyclic compounds having at least one ring sulfur atom, at least one exocyclic sulfur atom and at least one ring nitrogen atom and (B3) sulfur-comprising aliphatic carboxylic acids as corrosion inhibitor;

(C) at least one inorganic molybdate salt as further corrosion inhibitor;

(D) at least one inorganic phosphate salt as further corrosion inhibitor;

(E) at least one aliphatic, cycloaliphatic or aromatic monocarboxylic, dicarboxylic or tricarboxylic acid in the form of alkali metal, ammonium or substituted ammonium salts thereof having from 3 to 21 carbon atoms in the acid part.

The antifreeze component (A), which represents the main constituent of the antifreeze concentrate of the invention and therefore generally makes up more than 50% by weight of the concentrate, ensures problem-free starting of the engine when the internal combustion engine having a coolant composition produced therefrom is started in an environment significantly below 0° C. and then good flow behavior and good heat removal during operation of the engine. Suitable monohydric, dihydric or trihydric alcohols, polyhydroxy alcohols and their ethers for the component (A) are, for example, methanol, ethanol, n-propanol and isopropanol, n-butanol, isobutanol and sec-butanol, furfurol, tetrahydrofurfuryl alcohol, ethoxylated furfuryl alcohol, alkoxyalkanols such as methoxyethanol, monoethylene glycol, monopropylene glycol, diethylene glycol, dipropylene glycol, triethylene glycol, tripropylene glycol, tetraethylene glycol, tetrapropylene glycol, pentaethylene glycol, pentapropylene glycol, hexaethylene glycol, hexapropylene glycol, glycerol, sorbitol, mannitol, diglycerol, threitol, erythritol, adonitol (ribitol), arabitol (lyxitol), xylitol, dulcitol (galactitol), maltitol, isomaltitol, 1,2,6-hexanetriol, trimethylolpropane, trimethylolethane, pentaerythritol, and also monoethers of glycols such as methyl, ethyl, propyl and butyl ethers, with n-butyl ethers being preferred among these, of monoethylene glycol, monopropylene glycol, diethylene glycol and dipropylene glycol. Of course, mixtures of the alcohols, polyhydroxy alcohols and ethers mentioned can also be used. For the purposes of the present invention, the term propylene glycol encompasses both 1,2-propanediol and 1,3-propanediol.

In a preferred embodiment, the antifreeze concentrate with corrosion protection according to the invention comprises, as freezing point-lowering liquid (A), monoethylene glycol, monopropylene glycol or mixtures of monoethylene glycol or monopropylene glycol with up to 35% by weight of glycerol, in each case based on the total amount of freezing point-lowering liquid. Very particular preference is given to using monoethylene glycol without additions of other alcohols or ethers.

In embodiment (B1) of the corrosion inhibitor (B), the at least one sulfur-comprising organic compound comprises the structural element of the formula

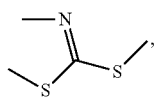

where the free bonds on the nitrogen atom and on a sulfur atom can be joined to a heterocyclic ring, in particular a five-membered or six-membered heterocyclic ring, which can then also come under the definition of embodiment (B2).

In embodiment (B2) of the corrosion inhibitor (B), the ring sulfur atom and the ring nitrogen atom preferably form a five-membered ring having a thiazole structure which bears a thio substituent in the form of a mercapto group (—SH) or a thioether group (—S-hydrocarbyl) in the 2 position. However, other heterocyclic, usually five- or six-membered ring systems, for example 3H-1,2,3-dithiazoles having such a thio substituent in the 4 or 5 position, 4H-1,4-thiazines having such a thio substituent in the 2, 3, 5 or 6 position or 2H-1,3,5-thiadiazines having such a thio substituent in the 2, 4 or 6 position, can also be used for (B2).

In a particularly preferred embodiment, the antifreeze concentrate with corrosion protection of the invention comprises at least one 2-thiothiazole of the general formula I

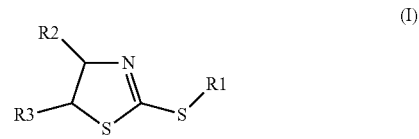

where the variable R1 is a carboxyalkyl radical of the formula —$(C_mH_{2m})$—COOX, where m is from 1 to 4 and X is hydrogen, an alkali metal cation, an ammonium cation or a substituted ammonium cation, and the variables R2 and R3 are each, independently of one another, hydrogen or a $C_1$-$C_4$-alkyl group, where R2 and R3 together with the two ring carbon atoms of the thiazole ring to which they are attached may also form a five- or six-membered saturated or unsaturated ring, as corrosion inhibitor (B1) or (B2).

The $C_1$-$C_4$-alkylene radical in the variable R1 can be a branched group such as 1,2-propylene, 1,2-butylene or 2,3-butylene or a linear polymethylene group. R1 is preferably a radical of the formula —$(CH_2)_m$—COOX, where m is 1, 2, 3 or 4, preferably 2 or 3.

If one or both of the variables R2 and R3 are $C_1$-$C_4$-alkyl groups, such alkyl groups are usually selected from among methyl, ethyl, n-propyl, isopropyl, n-butyl, isobutyl, sec-butyl and tert-butyl. In particular, R2 and R3 are both hydrogen or one of these variables is hydrogen and the other is methyl or ethyl or the two variables R2 and R3 together with the two ring carbon atoms of the thiazole ring to which they are attached form a benzene ring (benzo-fused ring systems).

If the variable X is an alkali metal cation, it is, for example, lithium or preferably sodium or potassium. If the variable X is an unsubstituted ammonium cation, this is derived from ammonia (NH3). If the variable X is a substituted ammonium cation, this is derived, for example, from monoalkylamines, dialkylamines or trialkylamines such as monoethylamine, diethylamine or triethylamine or from trialkanolamines such as triethanolamine or triisopropanolamine.

Some particularly preferred corrosion inhibitors of the embodiment (B1) or (B2) are (2-benzo-thiazylthio)acetic acid, 3-(2-benzothiazylthio)propionic acid or an alkali metal, ammonium or substituted ammonium salt thereof. The two corrosion inhibitors mentioned are commercially available under the name Sanbit® ABT and Danbit® PBT (manufacturer: Sanshin Chemical Industry). Furthermore, the likewise commercially available 2-mercaptobenzothiazole is also particularly preferred as corrosion inhibitor of the embodiment (B1) or (B2).

In embodiment (B3) of the corrosion inhibitor (B), the at least one sulfur-comprising organic compound comprises a sulfur-comprising aliphatic carboxylic acid. The compounds (B3) can comprise one or more, in particular 1, 2 or 3, carboxyl functions. The sulfur comprised therein can, for example, be present as a sulfide, sulfoxide or sulfone function. The compounds (B3) can additionally comprise hydrocarbyl radicals which are aliphatic, cycloaliphatic and/or araliphatic in nature and optionally further heteroatoms and/or functional groups in the molecule.

In a preferred embodiment, the antifreeze concentrate with corrosion protection of the invention comprises at least one sulfur-comprising aliphatic carboxylic acid selected from among 2,2-mercaptodiacetic acid, (thiobenzoylthio) acetic acid, 2-hydroxyalkyl carboxylalkyl sulfides, 2-hydroxyalkyl carboxylalkyl sulfoxides and their alkali metal, ammonium and substituted ammonium salts as corrosion inhibitor (B3). 2,2-Mercaptodiacetic acid (also referred to as thiodiglycolic acid: $HOOC-CH_2-S-CH_2-COOH$) and (thiobenzoylthio)acetic acid ($Ph-CS-S-CH_2-COOH$) are commercially available. 2-Hydroxyalkyl carboxylalkyl sulfides and 2-hydroxyalkyl carboxylalkyl sulfoxides of the formula alkyl-$CH(OH)-CH_2-S(=O)_n$-alkylene-COOH are described in EP 0 025 125 A1 as corrosion inhibitors for the treatment of water-conveying systems such as steam generation plants, heating systems, cooling water circuits and water piping systems.

As corrosion inhibitor (C), it is usual to use the alkali metal, ammonium or substituted ammonium salts of molybdic acid $H_2MoO_4$ or the acid itself, where alkali metal, ammonium or substituted ammonium salts have the meanings indicated above. However, the component (C) is generally present entirely or predominantly in salt form in the concentrate of the invention which normally has a pH of from 4 to 11. It is also possible to use mixtures thereof. Typical representatives of such molybdates (C) are sodium molybdate and potassium molybdate.

As corrosion inhibitor (D), it is usual to use the alkali metal, ammonium or substituted ammonium salts of orthophosphoric acid $H_3PO_4$ or the acid itself, where alkali metal, ammonium or substituted ammonium salts have the meanings indicated above. However, the component (D) will generally be present entirely or predominantly in salt form in the concentrate of the invention which normally has a pH of from 4 to 11, in particular from 7 to 11. When free orthophosphoric acid is used, this is usually converted by means of sodium or potassium hydroxide, ammonia or appropriate amines into the desired salts. Further suitable components (D) are alkali metal, ammonium or substituted ammonium salts of diphosphoric acid, of metaphosphoric acids, of pyrophosphoric acids and/or of polyphosphoric acids or the acids themselves, where alkali metal, ammonium or substituted ammonium salts have the meanings indicated above. It is also possible to use mixtures of the salts and/or acids mentioned. Typical representatives of such phosphates (D) are sodium dihydrogenphosphate, disodium hydrogenphosphate, trisodium phosphate, sodium diphosphate, tetrasodium pyrophosphate, sodium tripolyphosphate, sodium hexametaphosphate and the analogous potassium salts.

Possible corrosion inhibitors (E) are, in particular, individual representatives or mixtures of such representatives from the following groups of carboxylic acids:

(E1) aliphatic, cycloaliphatic or aromatic monocarboxylic acids having in each case from 3 to 16 carbon atoms in the form of their alkali metal, ammonium or substituted ammonium salts;

(E2) aliphatic or aromatic dicarboxylic or tricarboxylic acids having in each case from 3 to 21 carbon atoms in the form of their alkali metal, ammonium or substituted ammonium salts.

Possible linear or branched aliphatic or cycloaliphatic monocarboxylic acids of group (E1) are, for example, propionic acid, pentanoic acid, hexanoic acid, cyclohexylacetic acid, octanoic acid, 2-ethylhexanoic acid, nonanoic acid, isononanoic acid, decanoic acid, neodecanoic acid, undecanoic acid or dodecanoic acid. Suitable aromatic monocarboxylic acids of group (E1) are in particular benzoic acid and also, for example, $C_1$-$C_8$-alkylbenzoic acids such as o-, m- or p-methylbenzoic acid or p-tert-butylbenzoic acid, hydroxyl-comprising aromatic monocarboxylic acids such as o-, m- or p-hydroxybenzoic acid or p-(hydroxymethyl) benzoic acid or halobenzoic acids such as o-, m- or p-fluorobenzoic acid.

Typical examples of dicarboxylic or tricarboxylic acids of group (E2) are malonic acid, succinic acid, glutaric acid, pimelic acid, suberic acid, azelaic acid, sebacic acid, undecanedioic acid, dodecanedioic acid, cyclopentadienedicarboxylic acid, terephthalic acid, phthalic acid and triazinetriiminocarboxylic acids such as 6,6',6"-(1,3,5-triazine-2,4,6-triyltriimino)trihexanoic acid.

The abovementioned carboxylic acids (E) are usually present entirely or predominantly as alkali metal, ammonium or substituted ammonium salts, as defined above, even when they are to have been added as free acids in the production of the antifreeze concentrate of the invention since the concentrate normally has a pH of from 4 to 11, in particular from 7 to 11. Components (E) used as free carboxylic acids are usually converted by means of sodium or potassium hydroxide, ammonia or appropriate amines into the desired salts.

The interaction of the corrosion inhibitors (B) to (E) in the freezing point-lowering liquid (A) is critical to achieving the object stated at the outset. In addition, the antifreeze concentrate with corrosion protection of the invention can also comprise further corrosion inhibitors and/or other additive components, in each case individually or in mixtures and in the amounts customary for this purpose.

Further possible corrosion inhibitors (F) to (K) are:

(F) as inorganic salts, alkali metal borates, alkali metal silicates, alkali metal nitrites, alkali metal or alkaline earth metal nitrates and/or alkali metal or alkaline earth metal fluorides;

(G) aliphatic, cycloaliphatic or aromatic amines which have from 2 to 15 carbon atoms and can additionally comprise ether oxygen atoms or hydroxyl groups;

(H) monocyclic or bicyclic unsaturated or partially unsaturated heterocycles which have from 4 to 10 carbon atoms and can be benzo-fused and/or bear additional functional groups;

(J) tetra($C_1$-$C_8$-alkoxy)silanes (tetra-$C_1$-$C_8$-alkyl orthosilicates);

(K) carboxamides or sulfonamides.

In addition to the corrosion inhibitors (B) to (K) mentioned, it is also possible to use, for example, soluble salts of magnesium with organic acids, e.g. magnesium benzenesulfonate, magnesium methanesulfonate, magnesium acetate or magnesium propionate, hydrocarbazoles or quaternized imidazoles as are described in DE-A 196 05 509 as further inhibitors in customary amounts.

Typical examples of inorganic salts (F) are sodium tetraborate (borax), sodium metasilicate, sodium nitrite, sodium nitrate, magnesium nitrate, sodium fluoride, potassium fluoride and magnesium fluoride. When alkali metal silicates and alkali metal metasilicates are concomitantly used, these are advantageously stabilized by customary organosilicophosphonates or organosilicosulfonates in customary amounts.

The amines (G) preferably have from 2 to 9, in particular from 4 to 8, carbon atoms. The amines (G) are preferably tertiary amines. The amines (G) preferably comprise from 0 to 3 ether oxygen atoms or from 0 to 3 hydroxyl groups. Typical examples of amines (G) are ethylamine, propylamine, isopropylamine, n-butylamine, isobutylamine, sec-butylamine, tert-butylamine, n-pentylamine, n-hexylamine, n-heptylamine, n-octylamine, 2-ethylhexylamine, n-nonylamine, isononylamine, di-n-propylamine, diisopropylamine, di-n-butylamine, monoethanolamine, diethanolamine and triethanolamine, monoisopropanolamine, diisopropanolamine and triisopropanolamine, piperidine, morpholine, cyclohexylamine, aniline and benzylamine. Aliphatic and cycloaliphatic amines (G) are generally saturated.

The heterocycles (H) are, in particular monocyclic five- or six-membered systems which have 1, 2 or 3 nitrogen atoms and can be benzo-fused. However, it is also possible to use bicyclic systems having five- and/or six-membered heterocyclic partial rings which typically have a total of 2, 3 or 4 nitrogen atoms. The heterocycles (H) can additionally bear functional groups such as $C_1$-$C_4$-alkoxy, optionally substituted amino or mercapto. The heterocyclic skeleton can of course also bear alkyl groups, in particular $C_1$-$C_4$-alkyl groups. Typical examples of heterocycles (H) are benzotriazole, tolutriazole (tolyltriazole), hydrogenated tolutriazole, 1H-1,2,4-triazole, benzimidazole, benzothiazole, adenine, purine, 6-methoxypurine, indole, isoindole, isoindoline, pyridine, pyrimidine, 3,4-diaminopyridine, 2-aminopyrimidine and 2-mercaptopyrimidine.

Possible silanes (J) are, for example, tetramethoxysilane, tetraethoxysilane, tetra-n-propoxysilane or tetra-n-butoxysilane.

Typical examples of the aromatic, heteroaromatic, aliphatic and cycloaliphatic (with the amide group as part of the ring) carboxamides which can be used here and of the aliphatic and aromatic sulfonamides (K) which can be used here are given in DE-A 100 36 031. As representatives of all the amides mentioned there, mention will here be made of only the following as examples: adipamide, benzamide, anthranilamide, 3- and 4-aminobenzamide, N-methyl-2-pyrrolidone, picolinamide, nicotinamide, benzenesulfonamide, o- and p-toluene-sulfonamide and 2-aminobenzenesulfonamide.

Other additive components (L) to (O) can be:
(L) hard water stabilizers based on polyacrylic acid, polymaleic acid, acrylic acid-maleic acid copolymers, polyvinylpyrrolidone, polyvinylimidazole, vinylpyrrolidone-vinylimidazole copolymers and/or copolymers of unsaturated carboxylic acids and olefins; a commercially available hard water stabilizer which is suitable here is Sokalan® CP 42;
(M) antifoams;
(N) dyes;
(O) bitter substances for reasons of hygiene and safety in the case of swallowing, for example bitter substances of the type denatonium benzoate;

The amount of freezing point-lowering liquid (A) in the antifreeze concentrate of the invention is usually at least 75% by weight, preferably at least 80% by weight, in particular at least 85% by weight, especially at least 90% by weight, in each case based on the total amount of the concentrate.

The total amount of corrosion inhibitors (B) to (K) in the antifreeze concentrate of the invention is usually from 1 to 70% by weight, preferably from 2 to 35% by weight, in particular from 2.5 to 15% by weight, especially from 3 to 10% by weight, in each case based on the total amount of the concentrate.

The amount of sulfur-comprising organic compounds (B1), (B2) and/or (B3) in the antifreeze concentrate of the invention is usually from 0.01 to 5% by weight, preferably from 0.03 to 3% by weight, especially from 0.07 to 1% by weight, in each case based on the total weight of the concentrate.

The amount of inorganic molybdate salt (C) in the antifreeze concentrate of the invention is usually from 0.001 to 2% by weight, in particular from 0.003 to 1% by weight, especially from 0.007 to 0.5% by weight, in each case based on the total amount of the concentrate.

The amount of inorganic phosphate salt (D) in the antifreeze concentrate of the invention is usually from 0.1 to 8% by weight, in particular from 0.1 to 5% by weight, especially from 0.1 to 3% by weight, in each case based on the total amount of the concentrate.

The amount of aliphatic, cycloaliphatic or aromatic monocarboxylic, dicarboxylic and/or tricarboxylic acid (E) in the antifreeze concentrate of the invention is usually from 0.1 to 10% by weight, in particular from 0.5 to 8% by weight, especially from 1 to 5% by weight, in each case based on the total amount of the concentrate.

The amount of inorganic borate, silicate, nitrite, nitrate and/or fluoride salt (F) in the antifreeze concentrate of the invention is usually from 0 to 2% by weight, in particular from 0.01 to 2% by weight, especially from 0.1 to 1% by weight, in each case based on the total amount of the concentrate.

The amount of aliphatic, cycloaliphatic and/or aromatic amine (G) in the antifreeze concentrate of the invention is usually from 0 to 5% by weight, in particular from 0.01 to 5% by weight, especially from 0.1 to 3% by weight, in each case based on the total amount of the concentrate.

The amount of monocyclic or bicyclic heterocycles (H) in the antifreeze concentrate of the invention is usually from 0 to 5% by weight, in particular from 0.01 to 5% by weight, especially from 0.05 to 2% by weight, in each case based on the total amount of the concentrate.

The amount of tetra($C_1$-$C_8$-alkoxy)silane (J) in the antifreeze concentrate of the invention is usually from 0 to 5% by weight, in particular from 0.01 to 5% by weight, especially from 0.1 to 2% by weight, in each case based on the total amount of the concentrate.

The amount of carboxamide and/or sulfonamide (K) in the antifreeze concentrate of the invention is usually from 0 to 10% by weight, in particular from 0.01 to 10% by weight, especially from 0.1 to 5% by weight, in each case based on the total amount of the concentrate.

The amount of hard water stabilizers (L) in the antifreeze concentrate of the invention is usually from 0 to 1% by weight, in particular from 0.01 to 1% by weight, especially from 0.05 to 0.5% by weight, in each case based on the total amount of the concentrate.

The amount of antifoam (M) in the antifreeze concentrate of the invention is usually from 0 to 0.5% by weight, in particular from 0.001 to 0.05% by weight, especially from 0.002 to 0.02% by weight, in each case based on the total amount of the concentrate.

The amount of dye (N) in the antifreeze concentrate of the invention is usually from 0 to 0.05% by weight, in particular from 0.001 to 0.05% by weight, in each case based on the total amount of the concentrate.

The amount of bitter substance (0) in the antifreeze concentrate of the invention is usually from 0 to 0.05% by weight, in particular from 0.001 to 0.05% by weight, in each case based on the total amount of concentrate.

The antifreeze concentrate of the invention can additionally comprise small amounts of water, usually from 0 to 10% by weight, in particular from 0 to 5% by weight, in each case based on the total amount of the concentrate. The total amount of all components comprised in the antifreeze concentrate of the invention (including the water) is in all cases 100.0% by weight.

In a preferred embodiment, the antifreeze concentrate of the invention comprises from 75 to 99.5% by weight of the freezing point-lowering liquid (A), a total of from 0.5 to 25% by weight of the corrosion inhibitors (B) to (E), from 0 to 10% by weight of further corrosion inhibitors which are different from (B) to (E) and are normally selected from the abovementioned groups (F) to (K) and also from 0 to 10% by weight of water.

The antifreeze concentrate of the invention can be produced by simple mixing of the individual components. However, the antifreeze concentrate of the invention can also be produced by dilution of an appropriate superconcentrate in which the active components (B) to (0) are present in higher concentration with the freezing point-lowering liquid (A) functioning as antifreeze component and optionally some water. The proportion of the superconcentrate in the concentrate is generally from 3 to 60% by weight. Superconcentrates are, usually for transport purposes, produced from concentrates having a normal concentration by withdrawal of such an amount of antifreeze component that the further constituents are still just present in dissolved form.

The present invention also provides an aqueous coolant composition comprising from 10 to 90% by weight, in particular from 20 to 60% by weight, of the antifreeze concentrate of the invention. The aqueous coolant composition of the invention is usually produced from the antifreeze concentrate of the invention by dilution with the appropriate amount of water.

The present patent application further provides for the use of the abovementioned aqueous coolant composition of the invention for cooling an internal combustion engine whose cooling apparatus has been made predominantly or solely of aluminum using a soldering process using a fluoroaluminate flux. In this way, the problem of precipitation of aluminum hydroxide gels and formation of sludge in the cooling circuit in such cooling apparatuses, as indicated at the outset, is solved in a very advantageous way. The aqueous coolant composition of the invention thus has a significantly higher tolerance to residues of fluoroaluminate fluxes and as a result provides more effective corrosion protection.

A series of the abovementioned sulfur-comprising organic compounds (B) are also generally suitable as extraordinarily effective corrosion inhibitors in antifreeze concentrates, even in cooling apparatuses and heat transfer circuits which do not contain any aluminum radiators soldered using fluoroaluminate fluxes. The present invention therefore also provides for the use of (2-benzothiazylthio)acetic acid, 3-(2-benzothiazylthio)propionic acid, 2,2-mercaptodiacetic acid, (thiobenzoylthio)acetic acid, 2-hydroxyalkyl carboxylalkyl sulfides, 2-hydroxyalkyl carboxylalkyl sulfoxides and their alkali metal, ammonium and substituted ammonium salts as corrosion inhibitors in antifreeze concentrates based on freezing point-lowering liquids selected from among monovalent, divalent and trivalent alcohols, polyhydroxy alcohols, their ethers and mixtures thereof as main constituent and in aqueous coolant compositions produced therefrom.

The following examples illustrate the present invention without restricting it.

EXAMPLES

The following corrosion experiments were carried out in accordance with ASTM D 4340. This standard test serves to determine the corrosion susceptibility of aluminum or aluminum alloys in cooling apparatuses for internal combustion engines. The standard apparatus used for this purpose simulates the aluminum-comprising hot inner surface of a cooling circuit of an internal combustion engine. An aluminum test plate is heated from below while its upper surface is in contact with the cooling fluid to be tested. The test temperature is 135° C. After conclusion of the test after the set-down test time of 168 hours, the plate is assessed visually for corrosion and the weight change (before or after pickling) is determined by weighing.

Coolant Compositions KM1 to KM6 Used [Components in % by Weight]:

| Component | KM1 | KM2 | KM3 |
|---|---|---|---|
| Monoethylene glycol | 91.77 | 90.95 | 90.96 |
| (2-Benzothiazylthio)acetic acid | 0 | 0.15 | 0.15 |
| Sodium molybdate | 0 | 0.2 | 0.2 |
| Phosphoric acid (75% by weight in water) | 0 | 0.15 | 0.15 |
| Azelaic acid | 3.0 | 3.0 | 0 |
| Sebacic acid | 0 | 0 | 3.0 |
| Isononanoic acid | 0.6 | 0.6 | 0.6 |
| Tolutriazole | 0.1 | 0.1 | 0.15 |
| Commercial tetraalkoxysilane | 0.27 | 0.27 | 0.43 |
| Commercial hard water stabilizer | 0.15 | 0.15 | 0.15 |
| Denatonium benzoate | 0.01 | 0.01 | 0.01 |
| Commercial antifoam | 0.01 | 0.01 | 0.01 |
| Potassium hydroxide (48% by weight in water) | 4.09 | 4.41 | 4.19 |

| Component | KM4 | KM5 | KM6 | KM7 |
|---|---|---|---|---|
| Monoethylene glycol | 90.55 | 92.55 | 92.55 | 92.55 |
| (2-Benzothiazylthio)acetic acid | 0 | 0 | 0 | 0.1 |
| 2-Mercaptobenzothiazole | 0 | 0 | 0.1 | 0 |
| 2,2-Mercaptodiacetic acid | 0 | 0.1 | 0 | 0 |
| Sodium molybdate | 0.01 | 0.01 | 0.01 | 0.01 |
| Phosphoric acid (75% by weight in water) | 1.33 | 1.33 | 1.33 | 1.33 |
| 2-Ethylhexanoic acid | 3.0 | 3.0 | 3.0 | 3.0 |
| Tolutriazole | 0.1 | 0.1 | 0.1 | 0.1 |
| Commercial tetraalkoxysilane | 0.43 | 0.43 | 0.43 | 0.43 |
| Commercial hard water stabilizer | 0.15 | 0.15 | 0.15 | 0.15 |
| Denatonium benzoate | 0.01 | 0.01 | 0.01 | 0.01 |
| Potassium hydroxide (48% by weight in water) | 4.42 | 2.32 | 2.32 | 2.32 |

The coolant compositions KM1 to KM7 were each diluted in a volume ratio of 50:50 with deionized water for carrying out the test.

Corrosion Test Using KM1 and KM2 with $KAlF_4$ in Accordance with ASTM D 4340 (after Pickling):

KM1 (for comparison), KM2 (according to the invention) and KM3 (according to the invention) were each admixed with 600 mg of potassium tetrafluoroaluminate per liter of the coolant composition before the test in order to simulate contamination with flux. In the case of KM1, the aluminum test plate had acquired a black tarnish after the test and displayed severe corrosion; the weight change was +2.90 mg/cm². In the case of KM2 and KM3, the aluminum test plate was unchanged and without a deposit and displayed no corrosion phenomena; the weight change was only minimal and was in each case −0.19 mg/cm².

Corrosion Test Using KM4 to KM7 with KAlF₄ in Accordance with ASTM D 4340 (without Pickling):

KM4 (for comparison), KM5 (according to the invention), KM6 (according to the invention) and KM7 (according to the invention) were each admixed with 300 mg of potassium tetrafluoroaluminate per liter of coolant composition before the test in order to simulate contamination with flux; KM7 was, in a second test run (KM7a, according to the invention) mixed beforehand with a doubled amount of KAlF₄ (600 mg per liter). In the case of KM4, the aluminum test plate after the test displayed significant traces of corrosion; the weight change was −0.34 mg/cm². In the case of KM5, KM6, KM7 and KM7a, the aluminum test plates were each slightly tarnished and displayed a deposit; the weight changes were minimal and were −0.12 mg/cm² in the case of KM5, +0.06 mg/cm² in the case of KM6, +0.04 mg/cm² in the case of KM7 and +0.07 mg/cm² in the case of KM7a.

Corrosion Test Using KM4, KM5 and KM7 without KAlF₄ in Accordance with ASTM D 4340 (without Pickling):

KM4 (for comparison), KM5 (according to the invention) and KM7 (according to the invention) were subjected to the corrosion test without prior addition of KAlF₄. In the case of KM4, the aluminum test plate after the test likewise displayed significant traces of corrosion; the weight change was once again −0.34 mg/cm². In the case of KM5 and KM7, the aluminum test plates had an iridescent tarnish; the weight changes were minimal and were −0.08 mg/cm² in the case of KM5 and 0 mg/cm² in the case of KM7.

Influence of Pickling and Significance of Tarnishing for the Aluminum Test Plates:

For the interpretation of the experimental results, it should be pointed out that during pickling the deposit formed during the test run by corrosive removal from the test plate and reprecipitation from the cooling fluid is completely or at least largely removed again. This results in an only slightly positive (when the removal of the deposit by pickling is incomplete) or slightly negative weight change (when the removal of the deposit by pickling is complete and the corrosive removal from the plate becomes discernible in the weight). The extent of deposit formation during the test and also the deposit layer still remaining after pickling are measures of the corrosion susceptibility. A residual deposit of +2.90 mg/cm² in the case of KM1 thus indicates a high corrosion susceptibility compared to a value of −0.19 mg/cm² in the case of KM2 and KM3.

A black tarnish on the aluminum test plates as in the case of KM1, usually associated with visible corrosion damage, is an indication of high corrosion susceptibility. An iridescent tarnish as in the case of KM5 and KM7 in the test run without pickling, on the other hand, generally is a sign of formation of a very thin protective layer and indicates a good corrosion protection action.

The invention claimed is:

1. An antifreeze concentrate, comprising:
   (A) at least one freezing point-lowering liquid selected from the group consisting of a monohydric alcohol, a dihydric alcohol, a trihydric alcohol, a polyhydroxy alcohol, and ethers thereof as a main constituent;
   (B) at least one sulfur-comprising aliphatic carboxylic acid selected from the group consisting of 2,2-mercaptodiacetic acid (thiobenzoylthio)acetic acid, a 2-hydroxyalkyl carboxylalkyl sulfide, a 2-hydroxyalkyl carboxylalkyl sulfoxide, and their alkali metal, ammonium and substituted ammonium salts as a corrosion inhibitor;
   (C) at least one inorganic molybdate salt as a further corrosion inhibitor;
   (D) at least one inorganic phosphate salt as a further corrosion inhibitor;
   (E) at least one acid selected from the group consisting of an aliphatic monocarboxylic acid, an aliphatic tricarboxylic acid, a cycloaliphatic monocarboxylic acid, a cycloaliphatic tricarboxylic acid, an aromatic monocarboxylic acid, an aromatic tricarboxylic acid, a cycloaliphatic monocarboxylic acid, a cycloaliphatic dicarboxylic acid, a cycloaliphatic tricarboxylic acid, an aromatic monocarboxylic acid, and an aromatic dicarboxylic acid, and an aromatic tricarboxylic acid, wherein the least one acid is in the form of an alkali metal, ammonium or substituted ammonium salt thereof having from 3 to 21 carbon atoms in the acid part.

2. The antifreeze concentrate of claim 1, comprising monoethylene glycol, monopropylene glycol or mixtures of monoethylene glycol or monopropylene glycol with up to 35% by weight of glycerol as freezing point-lowering liquid (A), in each case based on the total amount of freezing point-lowering liquid.

3. The antifreeze concentrate of claim 1, comprising from 75 to 99.5% by weight of the freezing point-lowering liquid (A), a total of from 0.5 to 25% by weight of the corrosion inhibitors (B) to (E), from 0 to 10% by weight of further corrosion inhibitors which are different from (B) to (E) and from 0 to 10% by weight of water.

4. An aqueous coolant composition comprising from 10 to 90% by weight of the antifreeze concentrate of claim 1.

5. A process for cooling an internal combustion engine whose cooling apparatus has been made predominantly or solely of aluminum using a soldering process using a fluoroaluminate flux, the process comprising adding the aqueous coolant composition of claim 4 to the engine.

6. The antifreeze concentrate of claim 1, comprising (A) a monohydric alcohol.

7. The antifreeze concentrate of claim 1, comprising (A) a dihydric alcohol.

8. The antifreeze concentrate of claim 1, comprising (A) a trihydric alcohol.

9. The antifreeze concentrate of claim 1, comprising (A) a polyhydroxy alcohol.

10. The antifreeze concentrate of claim 1, comprising (A) an ether of a monohydric alcohol, an ether of a dihydric alcohol, an ether of a trihydric alcohol, or an ether of a polyhydroxy alcohol.

\* \* \* \* \*